US011276388B2

(12) United States Patent
Ru

(10) Patent No.: US 11,276,388 B2
(45) Date of Patent: Mar. 15, 2022

(54) BEAMFORMING SYSTEM BASED ON DELAY DISTRIBUTION MODEL USING HIGH FREQUENCY PHASE DIFFERENCE

(71) Applicant: Nuvoton Technology Corporation, Hsinchu (TW)

(72) Inventor: Powen Ru, San Jose, CA (US)

(73) Assignee: NUVOTON TECHNOLOGY CORPORATION, Hsinchu (TW)

(*) Notice: Subject to any disclaimer, the term of this patent is extended or adjusted under 35 U.S.C. 154(b) by 107 days.

(21) Appl. No.: 16/836,866

(22) Filed: Mar. 31, 2020

(65) Prior Publication Data
US 2021/0304730 A1    Sep. 30, 2021

(51) Int. Cl.
| | | |
|---|---|---|
| G10K 11/34 | (2006.01) | |
| H01Q 3/26 | (2006.01) | |
| G10K 11/36 | (2006.01) | |
| G10L 21/0272 | (2013.01) | |
| H04S 7/00 | (2006.01) | |
| G01S 3/48 | (2006.01) | |
| G10L 21/0224 | (2013.01) | |
| H04R 3/00 | (2006.01) | |
| G01S 3/80 | (2006.01) | |

(Continued)

(52) U.S. Cl.
CPC ............ *G10K 11/346* (2013.01); *G10K 11/36* (2013.01); *H01Q 3/2682* (2013.01); *G01S 3/48* (2013.01); *G01S 3/80* (2013.01); *G10L 19/008* (2013.01); *G10L 21/0224* (2013.01); *G10L 21/0272* (2013.01); *G10L 25/57* (2013.01); *H04R 3/005* (2013.01); *H04S 7/00* (2013.01)

(58) Field of Classification Search
CPC .... G10K 11/346; G10K 11/36; H01Q 3/2682; G01S 3/80; G01S 3/48; H04R 3/005; H04S 7/00; G10L 19/008; G10L 21/0224; G10L 21/0272; G10L 25/57; G10L 21/0208
See application file for complete search history.

(56) References Cited

U.S. PATENT DOCUMENTS 5,581,620 A * 12/1996 Brandstein ........... G10K 11/346
367/125
5,659,520 A * 8/1997 Watson ................. G01S 3/8083
342/146

(Continued)

OTHER PUBLICATIONS

Huang et al, Robust Multiple Speech Source Localization using time delay histogram (Year: 2016).*

*Primary Examiner* — Matthew A Eason
*Assistant Examiner* — Kuassi A Ganmavo
(74) *Attorney, Agent, or Firm* — Kilpatrick Townsend & Stockton LLP

(57) ABSTRACT

A beamforming system comprises an input module, a phase-difference module, a delay distribution module, and a delay estimation module configured to make a final delay estimation based on the delay distribution. The final delay estimation is applied to align one of two selected channels and combine the two channels to obtain a signal of interest. The phase-difference module calculates phase differences for a range of frequency bins. The delay estimation module considers all possible delays derived from the phase differences, including multiples of $\pm 2\pi$ to overcome the ambiguity in high frequency bins when the spacing between two acoustic sensors is longer than the half of the wavelengths.

19 Claims, 10 Drawing Sheets

(51) Int. Cl.
*G10L 19/008* (2013.01)
*G10L 25/57* (2013.01)

(56) References Cited

U.S. PATENT DOCUMENTS

| | | | | |
|---|---|---|---|---|
| 2002/0011952 A1* | 1/2002 | Pack | ............ | G01S 3/48 |
| | | | | 342/442 |
| 2007/0050441 A1* | 3/2007 | Taenzer | ............ | H04R 3/005 |
| | | | | 708/446 |
| 2013/0272097 A1* | 10/2013 | Kim | ............ | G10L 17/00 |
| | | | | 367/129 |
| 2019/0122686 A1* | 4/2019 | Slapak | ............ | G10L 21/0232 |
| 2020/0393420 A1* | 12/2020 | Pellegretti | ............ | G01N 29/346 |

* cited by examiner

BEAMFORMING SYSTEM BASED ON DELAY DISTRIBUTION MODEL USING HIGH FREQUENCY PHASE DIFFERENCE

BACKGROUND OF THE INVENTION

This application relates to beamforming devices, systems, and methods requiring acoustic localization. More specifically, some embodiments of the invention are directed to using a delay distribution model to estimate an aligning signal to obtain a signal of interest.

Beamforming is a technique used in acoustic processing in which some channels of a multi-sensor array are aligned using a delay-and-sum technique to obtain a signal of interest. For example, FIG. 1 illustrates a method 100 for determining the distance between a source of sound wave and sensors. FIG. 1 depicts an exemplar array of two acoustic sensors $M_i$ and $M_j$, separated by a spacing "s," receiving sound waves $x_i[n]$ and $x_j[n]$ from a point source (not shown), the path of each wave forming an angle $\phi$ with respect to a hyper line between the two sensors. The difference between two paths "d" causes a delay in time $d_{seconds}$, corresponding to delay in samples $d_{sample}$. Here, $d_{seconds}$ is equal to d/c, with c being the speed of sound.

It may be desirable that the spacing between two sensors be large enough to get sufficiently different signals. However, when the spacing is larger than the half wavelength of a frequency, the phase difference may produce ambiguous delays. In this case, it may not be obvious whether the resulting phase is leading, trailing, or skipping multiple periods. A conventional remedy is to ignore the phase differences of high frequency bins and only rely on the phase differences of low frequency bins.

The inventor has recognized drawbacks associated with the conventional methods. For example, a signal of interest may be lack of low frequency energy, e. g., in some consonants in a voice. On the other hand, most environmental noises contain strong low frequency energy that tends to destroy the low frequency phase difference. Moreover, most acoustic sensors may not have consistence at lower frequency.

Therefore, it would be desirable to have an acoustic localization method to make use of high frequency phase difference in a sensor array with larger-than-half-wavelength spacing.

BRIEF SUMMARY OF THE INVENTION

A beamforming system comprises an input module, a phase-difference module, a delay distribution module, and a delay estimation module configured to make a final delay estimation based on the delay distribution. The final delay estimation is applied to align one of two selected channels and combine the two channels to obtain a signal of interest. The phase-difference module calculates phase differences for a range of frequency bins. The delay estimation module considers all possible delays derived from the phase differences, including multiples of $\pm 2\pi$ to overcome the ambiguity in high frequency bins when the spacing between two acoustic sensors is longer than the half of the wavelengths.

According to some embodiments of the present invention, an acoustic signal processing system includes an input module configured to receive at least two acoustic signals via at least two acoustic sensors, and convert the at least two acoustic signals into at least two channels of analog signals and, subsequently, at least two channels of digital signals. The acoustic signal processing system also includes a phase-difference module configured to convert the at least two channels of digital signals to at least two channels of frequency transforms, and calculate phase differences between two selected channels. Each frequency transform comprises a plurality of complex numbers. Each complex number corresponds to a frequency bin. Each phase difference is defined within $(-\pi, \pi)$ or $(-180$ degrees, $180$ degrees$)$.

The acoustic signal processing system also includes a delay distribution module configured to, for each frequency bin, derive ambiguous delays from the phase differences by adding or subtracting multiples of $2\pi$ or 360 degrees, keep the ambiguous delays within a valid delay range as candidate delays, and, for each candidate delay, add a spread function centering each candidate delay to form a delay distribution function. The valid delay range is predetermined according to a maximum acoustic propagation time delay between the at least two acoustic sensors plus a headroom. The acoustic signal processing system also has a delay estimation module configured to make a final delay estimation based on the delay distribution function, and a delay-and-sum module configured to align one of the two selected channels according to the final delay estimation to obtain a signal of interest.

According to some embodiments of the present invention, an acoustic signal processing system is provided. The acoustic signal processing system includes a microphone interface circuit configured for coupling to first and second acoustic sensors to receive first and second acoustic signals from a same acoustic signal source and to convert the first and second acoustic signals to first and second analog signals, respectively. The system also includes an analog-to-digital converter configured to receive the first and second analog signals and to generate first and second digital signals, respectively.

The system also includes a signal processing circuit configured to receive the first and second digital signals and to determine a delay between the first and second digital signals. The signal processing circuit includes a phase-difference module configured to transform the first and second digital signals to provide first and second frequency domain signals, and calculate a first set of phase differences between the first and second frequency domain signals at a plurality of selected frequencies. Each phase difference is a value defined within $(-\pi, \pi)$ or $(-180$ degrees, $180$ degrees$)$. The signal processing circuit also includes a delay distribution module configured to derive a second set of phase differences by adding and subtracting multiples of $2\pi$ or 360 degrees to each of the first set of phase differences, derive a plurality of candidate delay times at the plurality of selected frequencies based on the first set of phase differences and the second set of phase differences, and determine a histogram of the plurality of candidate delay times. The signal processing circuit also includes a delay estimation module configured to determine an estimated delay time by selecting a delay time having a maximum count in the histogram of the plurality of candidate delay times.

In some embodiments of the above acoustic signal processing system, the signal processing circuit can also include a delay-and-sum module configured to align the first and second digital signals according to the estimated delay time to obtain a signal of interest. In some embodiments, the delay distribution module is further configured to, for each candidate delay, add a spread function centering each candidate delay to a delay distribution function. In some embodiments, the delay distribution module is further configured to apply a frequency-dependent weighting function to the spread function. In some embodiments, the delay distribution module is configured to apply an energy-dependent temporal adapting scheme to smooth the delay distribution before determining the estimated delay time. In some embodiments, the phase-difference module is configured to use Fourier transform the first and second digital signals to provide first and second frequency domain signals. In some embodiments, the delay distribution module is further configured to, for each frequency bin, select the plurality of candidate delay times within a valid delay range as candidate delays. The valid delay range is predetermined according to the maximum acoustic propagation time delay between the first and second acoustic sensors plus a headroom. In some embodiments, the signal processing circuit comprises a digital signal processor. In some embodiments, the first and second acoustic sensors are disposed apart by a spacing greater than a half wavelength of the acoustic signals.

Some embodiments of the present invention provide a method for sensing an acoustic signal using two or more acoustic sensors. The method includes receiving acoustic signals from an acoustic signal source using first and second acoustic sensors. The first acoustic sensor receiving a first acoustic signal, and the second acoustic sensor receiving a second acoustic signal. The first and second acoustic signals are transformed into first and second digital signals. Next, the first and second digital signals are transformed into first and second frequency domain signals. The method includes determining a first set of phase differences between the first and second frequency domain signals, the first set of phase differences being defined within $(-\pi, \pi)$ or $(-180$ degrees, 180 degrees). Next, a second set of phase differences is determined by adding and subtracting multiples of $2\pi$ or 360 degrees to each of the first set of phase differences. A plurality of candidate delay times are then determined between the first and second frequency domain signals at a plurality of frequencies based on the first set of phase differences and the second set of phase differences. The method also selects an estimated delay time from the plurality of candidate delay times, the estimated delay time being associated with a largest number of the plurality of frequencies, the estimated delay time associated with an estimated distance between the first and second acoustic sensors.

Further, in some embodiments of the above method, the first and second digital signals are aligned and summed to produce an enhanced digital signal. In some embodiments, the first and second acoustic sensors are disposed apart by a spacing greater than a half wavelength of the acoustic signals.

BRIEF DESCRIPTION OF THE DRAWINGS

For a more complete understanding of the disclosure, reference is made to the following detailed description and accompanying drawings wherein.

DETAILED DESCRIPTION OF THE INVENTION

Figure 1:
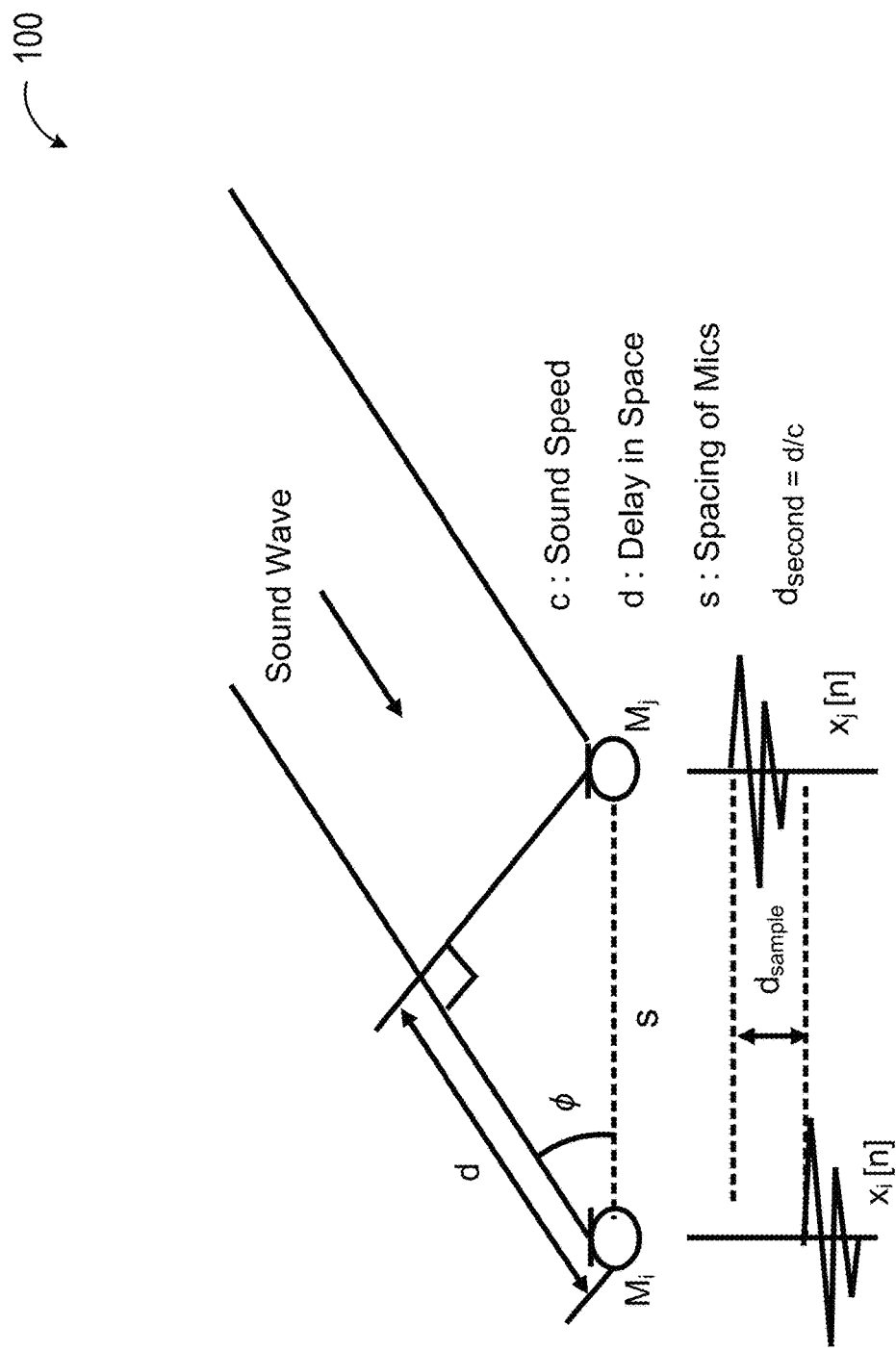
FIG. 1 illustrates a method for determining the distance between a source of sound waves and sensors.
Figure 2:
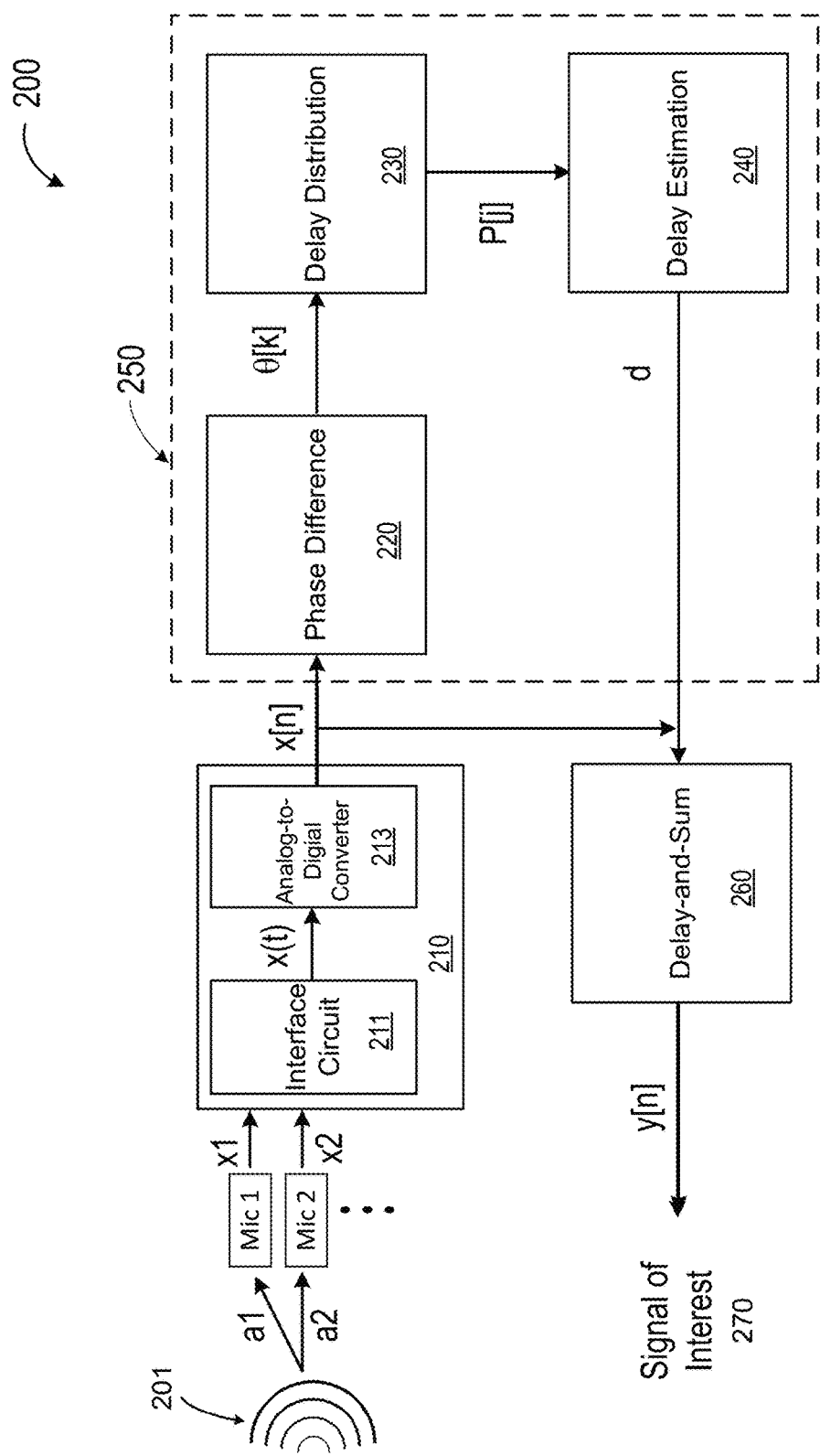
FIG. 2 is a simplified block diagram illustrating an acoustic signal processing system according to various embodiments of the present invention.

FIG. 2 is a simplified block diagram illustrating an acoustic signal processing system according to various embodiments of the present invention. As shown in FIG. 2, an acoustic signal processing system 200 includes an input module 210, and a signal processing circuit 250. In some embodiments, signal processing circuit 250 can include a phase-difference module 220, a delay distribution module 230, and a delay estimation module 240. Acoustic signal processing system 200 can also include a delay-and-sum module 260 to obtain a signal of interest 270.

As illustrated in FIG. 2, input module 210 is configured to receive at least two acoustic signals via at least two acoustic sensors, convert the at least two acoustic signals into at least two channels of analog signals and, subsequently, at least two channels of digital signals. In the example of FIG. 2, input module 210 can include a microphone interface circuit 211 and an analog-to-digital converter 213. Microphone interface circuit 211 is configured for coupling to first and second acoustic sensors, for example, microphones Mic1 and Mic2, to receive first and second acoustic signals, x1 and x2, from a same acoustic signal source 201. Microphone interface circuit 211 also converts the first and second acoustic signals, x1 and x2, to first and second analog signals x(t), respectively. Input module 210 also includes an analog-to-digital converter 213 configured to receive the first and second analog signals x(t) and to generate first and second digital signals x[n], respectively.

Figure 3:
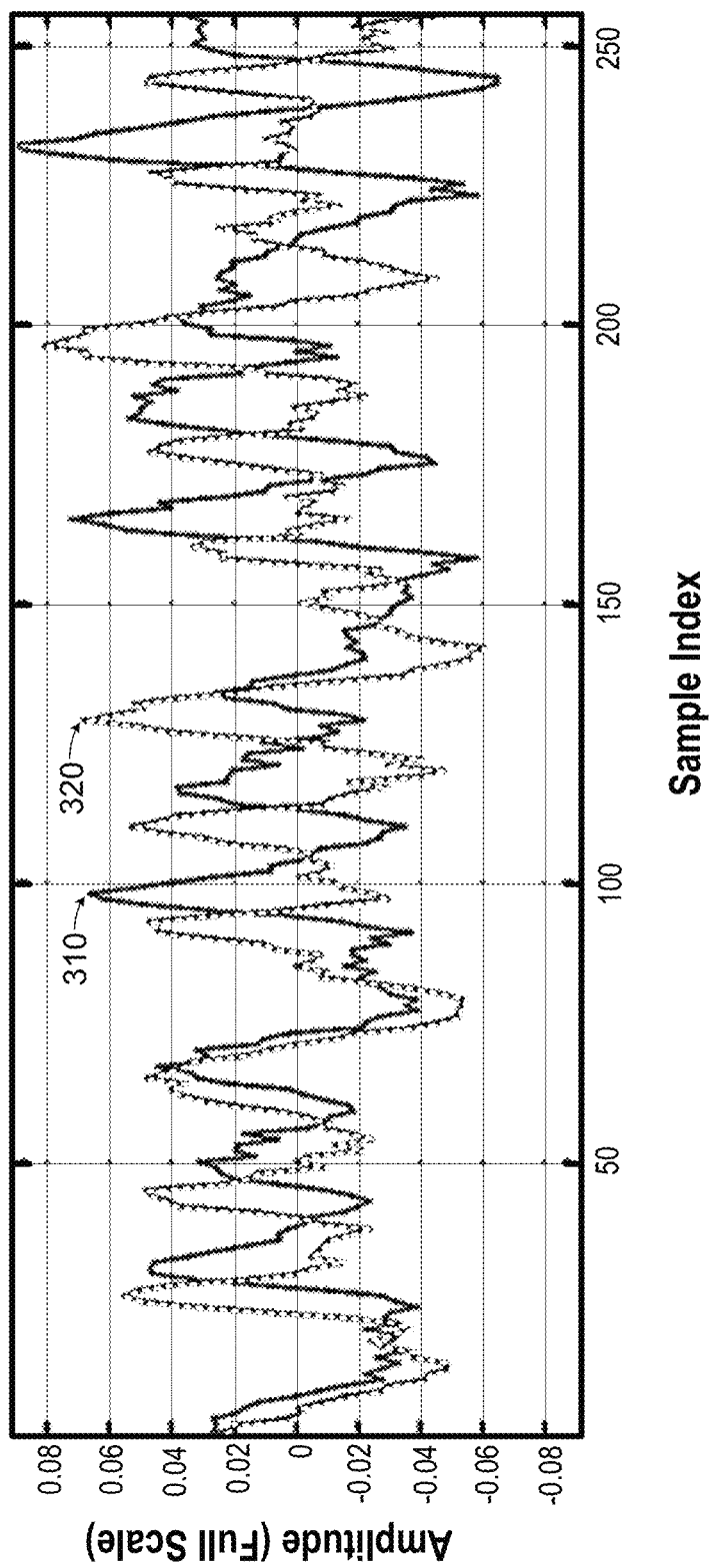
FIG. 3 is a diagram illustrating waveforms of an exemplary frame of a 2-channel 16 kHz signal according to various embodiments of the present invention.

FIG. 3 is a diagram illustrating waveforms of an exemplary frame of a 2-channel 16 kHz signal according to various embodiments of the present invention. As an example, digital signals x[n] can be sampled at, e.g., 16 kHz. FIG. 3 shows about 256 samples of a first digital signal 310 and about 256 samples of a second digital signal 320. In FIG. 3, the horizontal axis is the sample index, and the vertical axis is the amplitude of the digital signal. The differences between the two signals are sensed as two different microphones. The phase differences can be analyzed in phase-difference module 220, as described below.

Phase-difference module 220 configured to convert the at least two channels of digital signals, e.g., x1[n] and x2[n], to at least two channels of frequency transforms X[k]. The frequency transforms are frequency-domain representations of the digital signals. An example of frequency transform is the Fourier transform. Each frequency transform can include a plurality of complex numbers, and each complex number corresponds to a frequency bin, e.g., 253 bins, across 93~7969 Hz. Phase-difference module 220 also calculates phase differences between two selected channels, and produces a phase difference function θ[k]. Each phase difference is defined within (−π, π) or (−180 degrees, 180 degrees).

Figure 4:
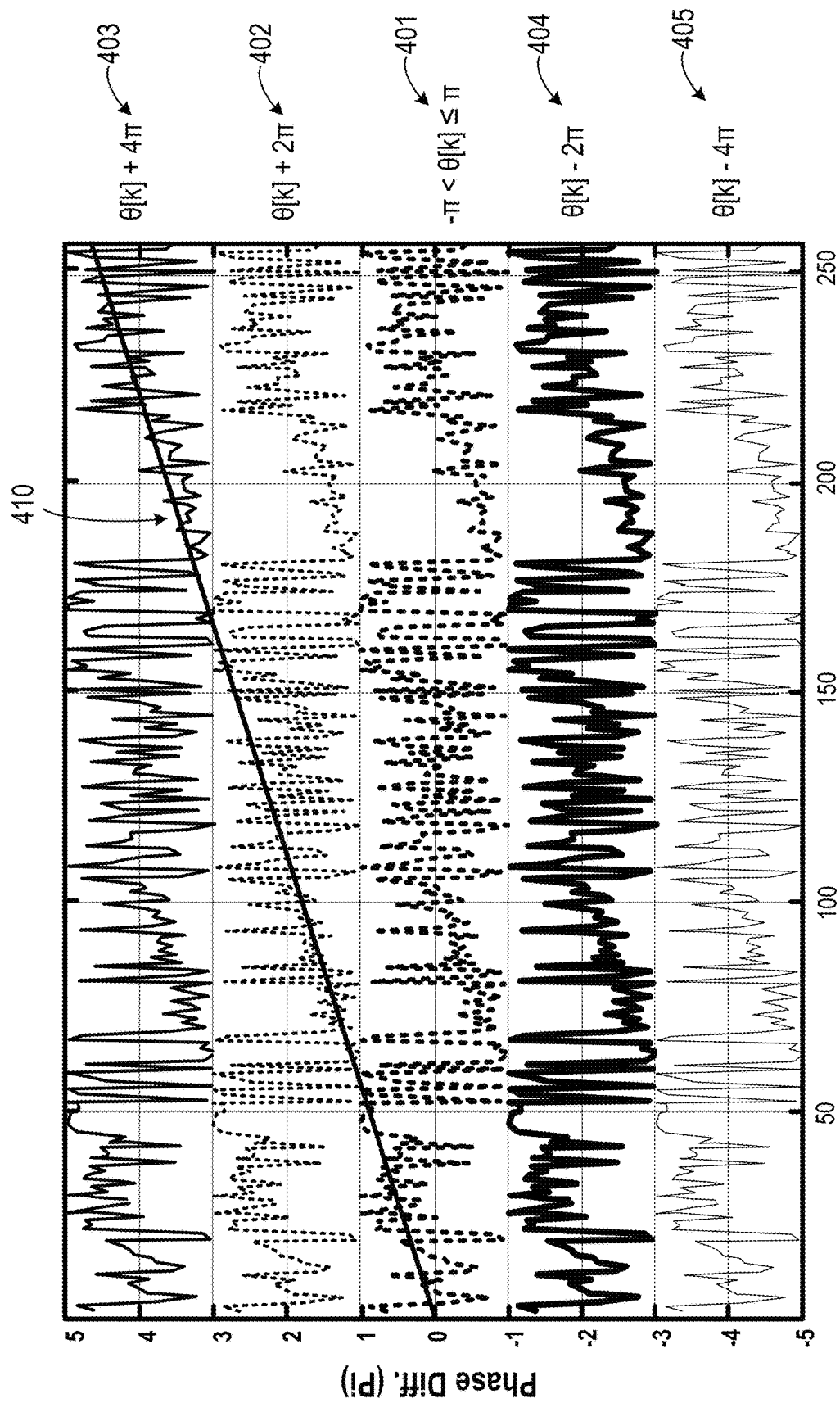
FIG. 4 is a diagram illustrating phase differences between two selected channels and their ambiguous phase differences according to various embodiments of the present invention.

FIG. 4 is a diagram illustrating phase differences between two selected channels and their ambiguous phase differences according to various embodiments of the present invention. In FIG. 4, the phase difference θ[k] is plotted against the frequency of the signal. The vertical axis is the phase difference θ[k] in units of π, spanning a range of −5 π to 5π. The horizontal axis is the frequency bin index. For example, a frequency range of 8K Hz can be divided into 256 bins. In FIG. 4, phase difference curve 401 marks the original phase difference that is confined by [−π, π], that is −π<θ[k]≤π.

Referring back to FIG. 2, delay distribution module 230 is configured to derive ambiguous delays from the original phase differences. As described above, when two sensors are far apart, the phase differences of the detected signals could be θ[k]±2π. The term θ[k]±2π is referred to as "ambiguous differences" or "ambiguous delays," from which a real delay can be identified. Delay distribution module 230 derives ambiguous delays from the original phase differences θ[k] by adding or subtracting multiples of 2π or 360 degrees for each frequency bin. For example, in FIG. 4, phase difference curve 402 marks a set of ambiguous delays that are derived from the original phase difference θ[k] plus 2π, resulting in phase differences in the range of [π, 3π]. Similarly, phase difference curve 403 marks a set of ambiguous delays that is derived from the original phase difference θ[k] plus 4π, resulting in phase differences in the range of [3π, 5π]. Phase difference curve 404 marks a set of ambiguous delays that are derived from the original phase difference θ[k] minus 2π, resulting in phase differences in the range of [−π, −3π]. Phase difference curve 405 marks a set of ambiguous delays that are derived from the original phase difference θ[k] minus 4π, resulting in phase differences in the range of [−3π, −5π].

As shown in FIG. 4, the ambiguous phase differences are above or below the original phase 401. FIG. 4 also shows a line 410, which highlights the ideal linear phase difference according to the delay.

The delay distribution module 230 initializes a delay distribution function P[j] to accumulate occurrences of delays derived from the phase differences, where j is an index to N delay bins, e.g., N=49 for 10 cm separation. As used herein, the term "delay" represents the time difference (e.g., in terms of µs, i.e., microseconds, or samples) between two signals that may be positive or negative. A positive delay means that the first signal is leading the second signal. A negative delay means that the first signal is trailing the second signal. A valid delay range [−T, T] is predetermined by the maximum acoustic propagation time delay between the two sensors, T=s/c+Δt, where s is the spacing between the two sensors (e. g., 10 cm), c is the velocity of sound (e. g., 343 m/sec, at room temperature), and Δt is a headroom to account for the variation of velocity of sound, e.g., T=375 µs.

For each frequency bin k, the delay distribution module derives at least one candidate delay corresponding to the phase difference θ[k]. More ambiguous delays d[k]'s can be derived from a phase difference by adding/subtracting multiples of 2π (360 degrees) to the phase difference, i.e., . . . θ[k]−4π, θ[k]−2π, θ[k]+2π, θ[k]+4π . . . for frequency bin k. The conversion formula is $$d_{second}(f) = \frac{\theta(f) \pm 2m\pi}{2\pi f} \text{ or } d_{sample}[k] = \frac{\theta[k] \pm 2m\pi}{2\pi} \cdot \frac{N_{FFT\_SIZE}}{k-1},$$

where the FFT_SIZE can be 512 for 16 kHz. Only those d[k] within the valid delay range [−T, T] are considered as candidates.

Figure 5:
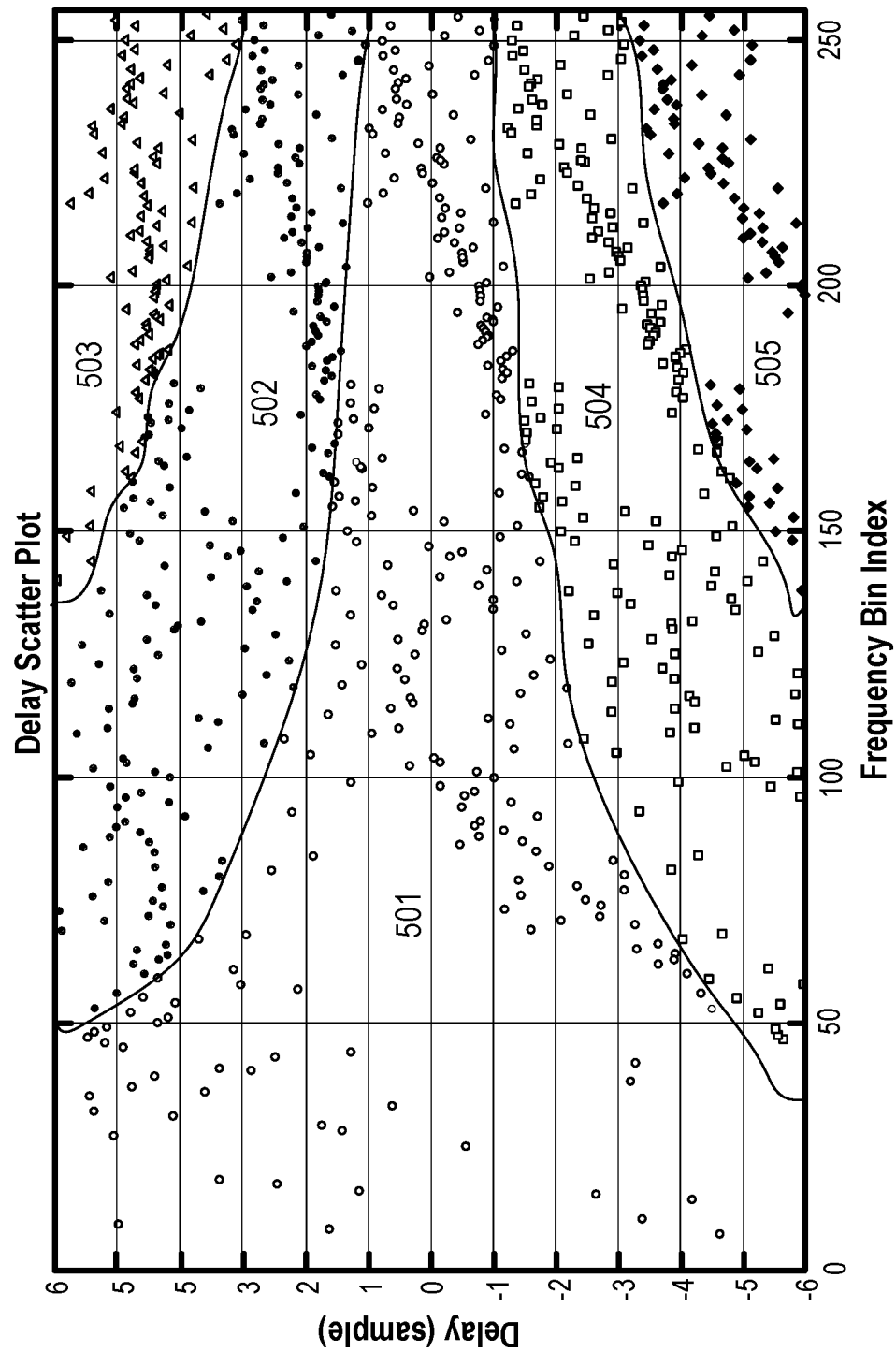
FIG. 5 is a delay scatter plot illustrating candidate delays derived from ambiguous phase differences according to various embodiments of the present invention.

FIG. 5 is a delay scatter plot illustrating candidate delays derived from ambiguous phase differences according to various embodiments of the present invention. The horizontal axis shows the frequency bin index, and the vertical axis shows the possible, or candidate, delays derived from the phase differences. The units of delay for the vertical axis are expressed in samples, determined by the sampling rate of the digital signal. FIG. 5 is an illustration of possible delays for each frequency component of the audio signal. For example, data points in region 501 in FIG. 5 represent possible delays in each frequency bin corresponding to the original phase difference θ[k] confined by [−π, π] identified by phase difference curve 401 in FIG. 4. Similarly, data points in region 502 in FIG. 5 correspond to a set of ambiguous delays that are derived from the original phase difference θ[k] plus 2π, resulting in phase differences in the range of [π, 3π] identified by phase difference curve 402 in FIG. 4. Data points in region 503 in FIG. 5 correspond to a set of ambiguous delays that are derived from the original phase difference θ[k] plus 4π, resulting in phase differences in the range of [3π, 5π] identified by phase difference curve 403 in FIG. 4. Data points in region 504 in FIG. 5 correspond to a set of ambiguous delays that are derived from the original phase difference θ[k] minus 2π, resulting in phase differences in the range of [−π, −3π] identified by phase difference curve 403 in FIG. 4. Data points in region 505 in FIG. 5 correspond to a set of ambiguous delays that are derived from the original phase difference θ[k] minus 4π, resulting in phase differences in the range of [−3π, −5π] identified by phase difference curve 405 in FIG. 4.

Figure 6:
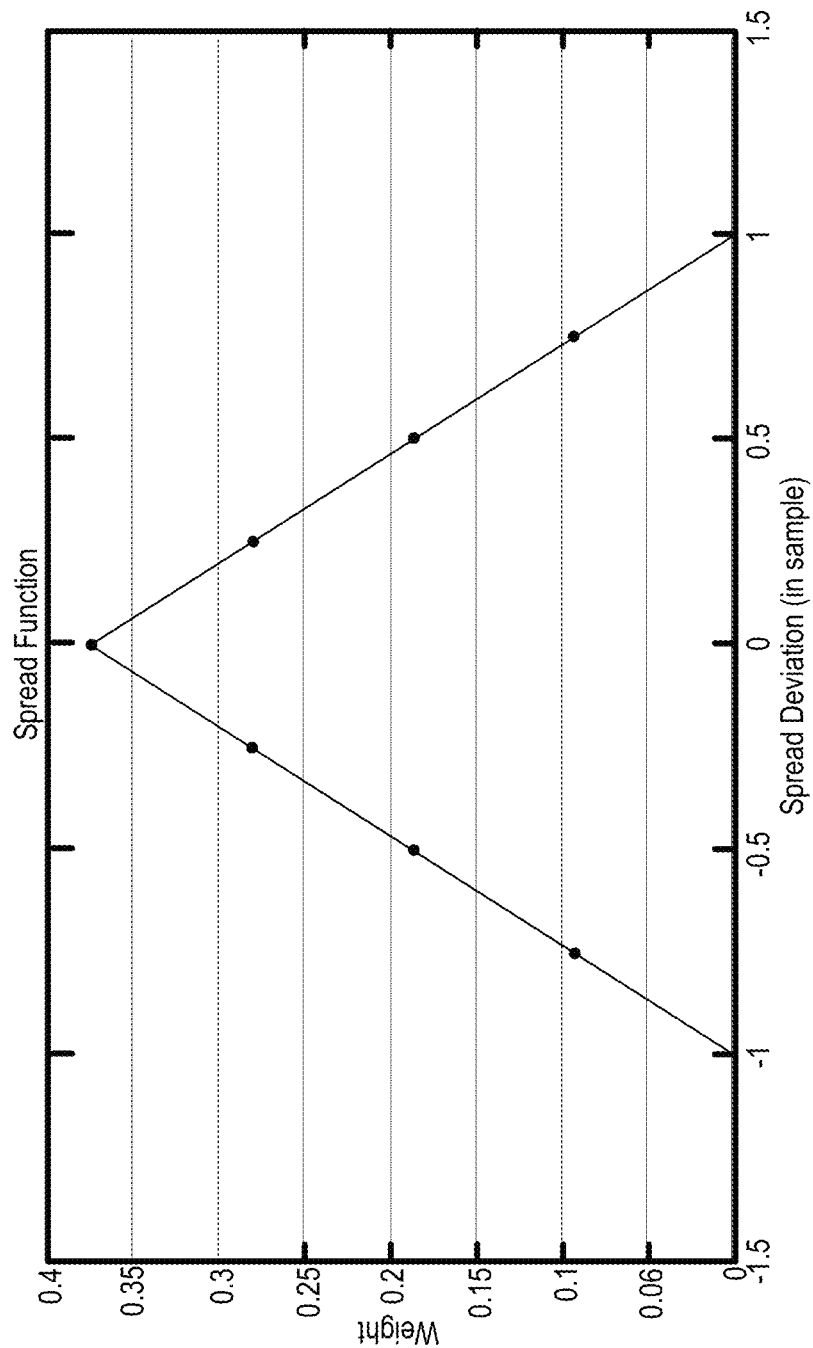
FIG. 6 is a diagram illustrating a delay distribution function and a smoothed version of the delay distribution function according to various embodiments of the present invention.

FIG. 6 is a diagram illustrating a delay distribution function and a smoothed version of the delay distribution function according to various embodiments of the present invention. In FIG. 6, the horizontal axis is the delay, similar to the vertical axis in FIG. 5, and the vertical axis shows the number of data points for each delay. The solid curve 610 is a delay distribution function derived from the delay scatter plot in FIG. 5, and the dashed curve 620 is a delay distribution function smoothed by the spread function.

In some embodiments, a temporal adapting scheme can be applied to maintain the consistency of the delay distribution function. The delay distribution function can be adapted according to the energy of the current frame and previous frames.

The delay estimation module 240 makes a final delay estimation by selecting the maximum of the delay distribution function. In FIG. 6, a maximum of the delay distribution function is marked as point 621. In the example of FIG. 6, the horizontal axis spans±6 samples. The maximum of the delay distribution at 621 corresponds to about 4.584 samples. With the particular sampling rate of the example, the estimated delay is about 285 µs (micro seconds).

Referring again to FIG. 2, the delay-and-sum module 260 is configured to apply the final delay estimation to align one of the two channels to obtain a signal of interest 270. For example, the signals from the two channels can be aligned to obtain a stronger signal.

Figure 7:
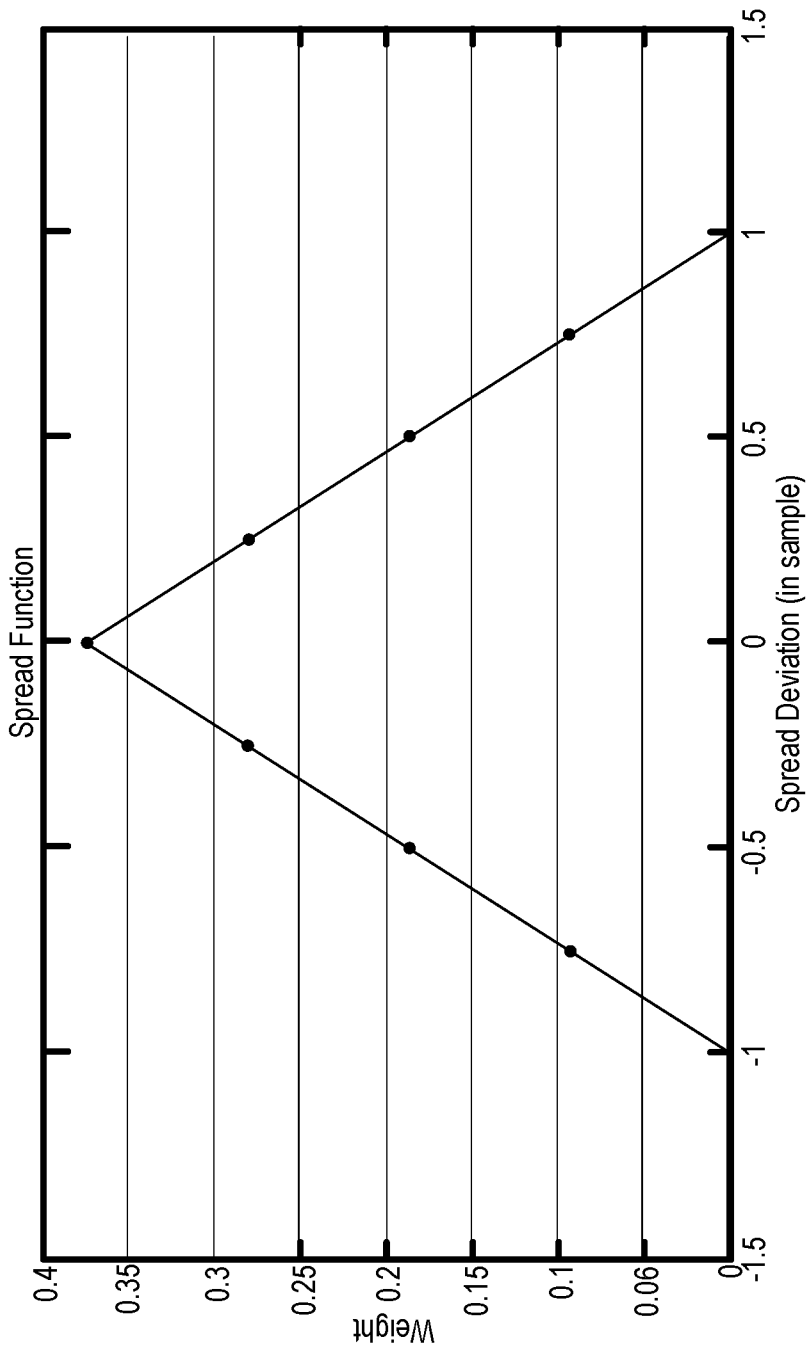
FIG. 7 illustrates a spread function according to various embodiments of the present invention.

FIG. 7 illustrates an exemplary spread function according to various embodiments of the present invention. For each candidate delay, a spread function centering the delay is accumulated to the delay distribution function. Depending on the embodiments, the spread function can further be weighted by a frequency-dependent weighting function to emphasize certain frequency range.

Figure 8:
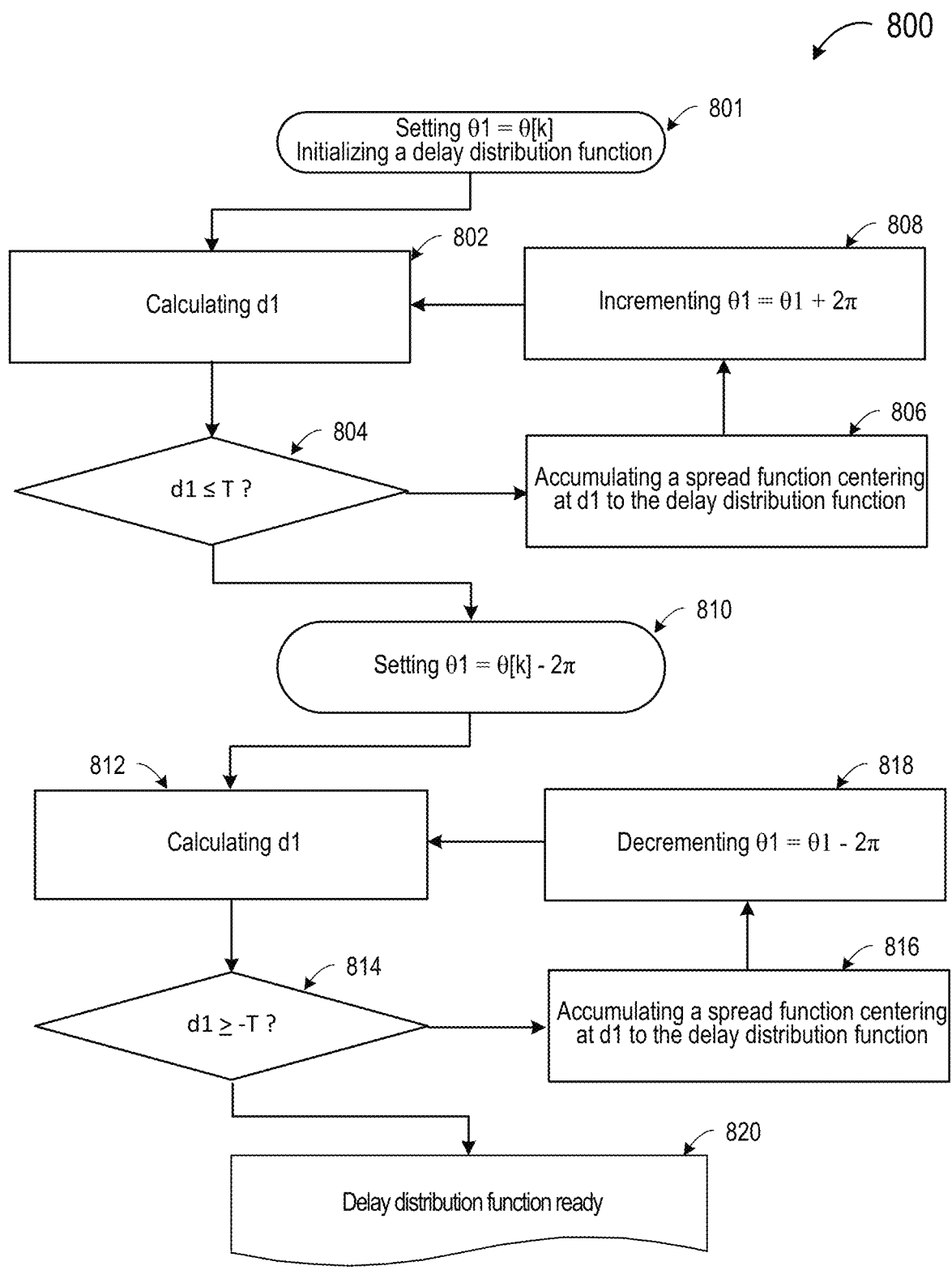
FIG. 8 is a flowchart illustrating a method for determining delay distribution accumulation according to various embodiments of the present invention.

FIG. 8 is a flowchart illustrating a method for determining delay distribution accumulation according to various embodiments of the present invention. As shown in FIG. 8, method 800 includes, at 801, initializing a delay distribution function by setting θ1=θ[k]. Here, θ[k] represents the original phase difference between the two signals. At 802, a distance d1 is calculated based on θ[k]. At 804, the distance is compared with the period T of the signals to determine if d1≤T.

If the condition d1≤T is true, the method, optionally, goes to 806, and accumulates a spread function centering at d1 to the delay distribution function. Next, at 808, to examine more candidate phase differences for each frequency bin, the method includes incrementing θ1=θ1+2π. Next, the method loops to 802.

From 804, if the condition d1≤T is not true, the method proceeds to 810 to examine more candidate phase differences. At 810, the method includes incrementing θ1=θ1-2π. At 812, a distance d1 is calculated based on θ[k]. At 814, the distance is compared with the period T of the signals to determine if d1≥T.

If the condition d1≥T is true, the method, optionally, goes to 816, and accumulates a spread function centering at d1 to the delay distribution function. Next, at 818, to examine more candidate phase differences for each frequency bin, the method includes decrementing θ1=θ1-2π. Next, the method loops to 812.

From 814, if the condition d1≥T is not true, the method proceeds to 820 where the delay distribution function is ready.

In some embodiments, an acoustic signal processing system is provided. The acoustic signal processing system includes a microphone interface circuit configured for coupling to first and second acoustic sensors to receive first and second acoustic signals from a same acoustic signal source and to convert the first and second acoustic signals to first and second analog signals, respectively. The system also includes an analog-to-digital converter configured to receive the first and second analog signals and to generate first and second digital signals, respectively.

The system also includes a signal processing circuit configured to receive the first and second digital signals and to determine a delay between the first and second digital signals. The signal processing circuit includes a phase-difference module configured to transform the first and second digital signals to provide first and second frequency domain signals, and calculate a first set of phase differences between the first and second frequency domain signals at a plurality of selected frequencies. Each phase difference is a value defined within (−π, π) or (−180 degrees, 180 degrees). The signal processing circuit also includes a delay distribution module configured to derive a second set of phase differences by adding and subtracting multiples of 2π or 360 degrees to each of the first set of phase differences, derive a plurality of candidate delay times at the plurality of selected frequencies based on the first set of phase differences and the second set of phase differences, and determine a histogram of the plurality of candidate delay times. The signal processing circuit also includes a delay estimation module configured to determine an estimated delay time by selecting a delay time having a maximum count in the histogram of the plurality of candidate delay times. Further, the signal processing circuit can also include a delay-and-sum module configured to align the first and second digital signals according to the estimated delay time to obtain a signal of interest. An example of the system is described above in connection with FIGS. 1-8.

Figure 9:
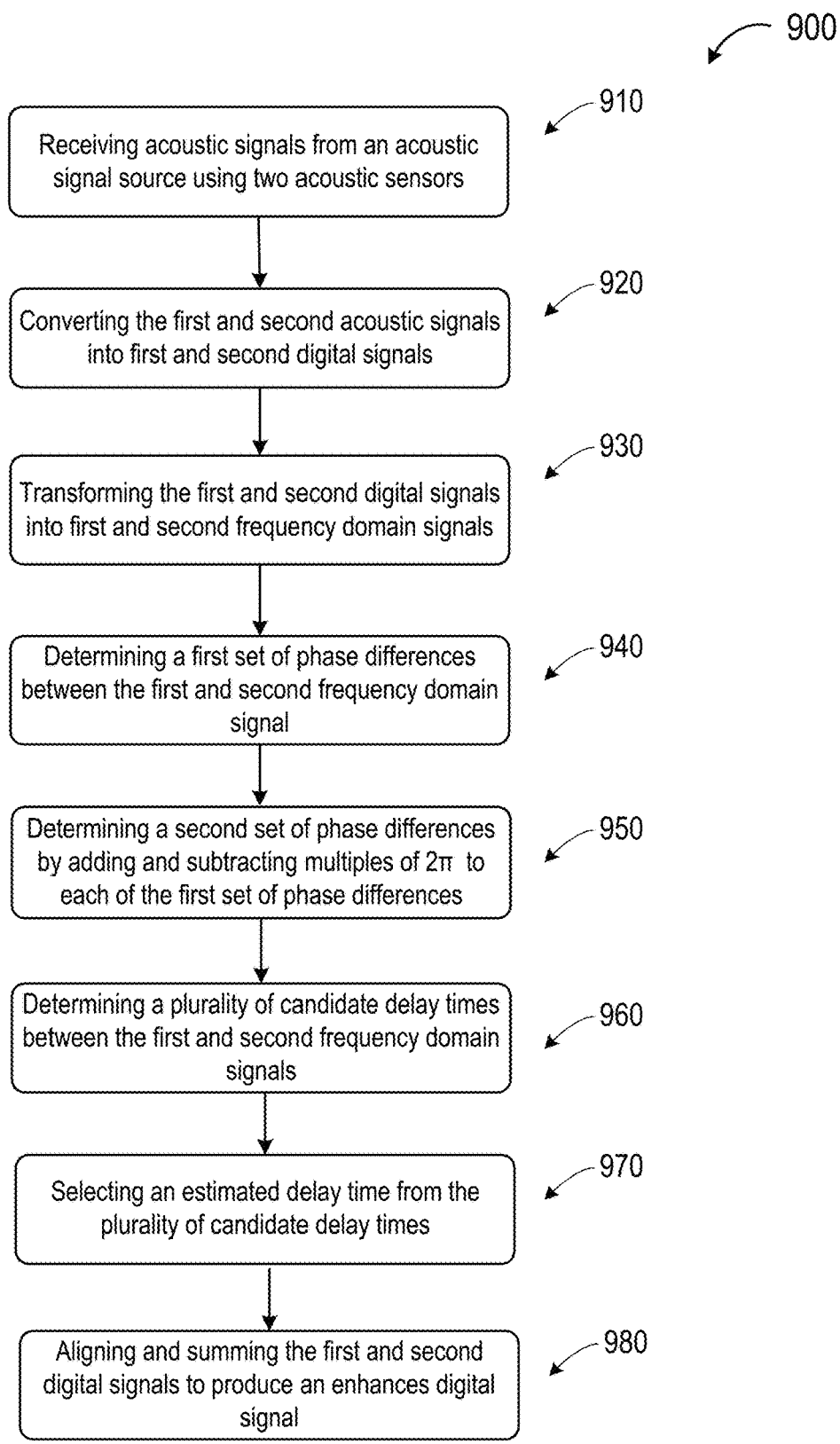
FIG. 9 is a simplified flow chart illustrating a method for sensing an acoustic signal using two or more acoustic sensors according to some embodiments of the present invention.

FIG. 9 is a simplified flow chart illustrating a method for sensing an acoustic signal using two or more acoustic sensors according to some embodiments of the present invention. As shown in FIG. 9, method 900 includes, at 910, receiving acoustic signals from an acoustic signal source using first and second acoustic sensors. The first acoustic sensor receiving a first acoustic signal, and the second acoustic sensor receiving a second acoustic signal. At 920, the first and second acoustic signals are transformed into first and second digital signals. At 930, the first and second digital signals are transformed into first and second frequency domain signals. At 940, the method includes determining a first set of phase differences between the first and second frequency domain signal, the first set of phase differences being defined within (−π, π) or (−180 degrees, 180 degrees). At 950, a second set of phase differences is determined by adding and subtracting multiples of 2π or 360 degrees to each of the first set of phase differences. At 960, a plurality of candidate delay times are determined between the first and second frequency domain signals at a plurality of frequencies based on the first set of phase differences and the second set of phase differences. At 970, the method selects an estimated delay time from the plurality of candidate delay times, the estimated delay time being associated with a largest number of the plurality of frequencies, the estimated delay time representing an estimated distance between the first and second acoustic sensors. At 980, the first and second digital signals are aligned and summed to produce an enhanced digital signal.

An example of the system that can be used to implement method 900 is described above in connection with FIGS. 1-8. In some embodiments of the method, the first and second frequency domain signals include a plurality of complex numbers, wherein each complex number corresponds to a frequency bin. In some embodiments, the method also includes using a Fourier transform to transform the first and second digital signals into first and second frequency domain signals. In some embodiments, determining a plurality of candidate delay times includes converting phase differences into delay times. In some embodiments, the method also includes determining a histogram of the plurality of candidate delay times, and determining an estimated delay time by selecting a delay time having a maximum count in the histogram of the plurality of candidate delay times.

Figure 10:
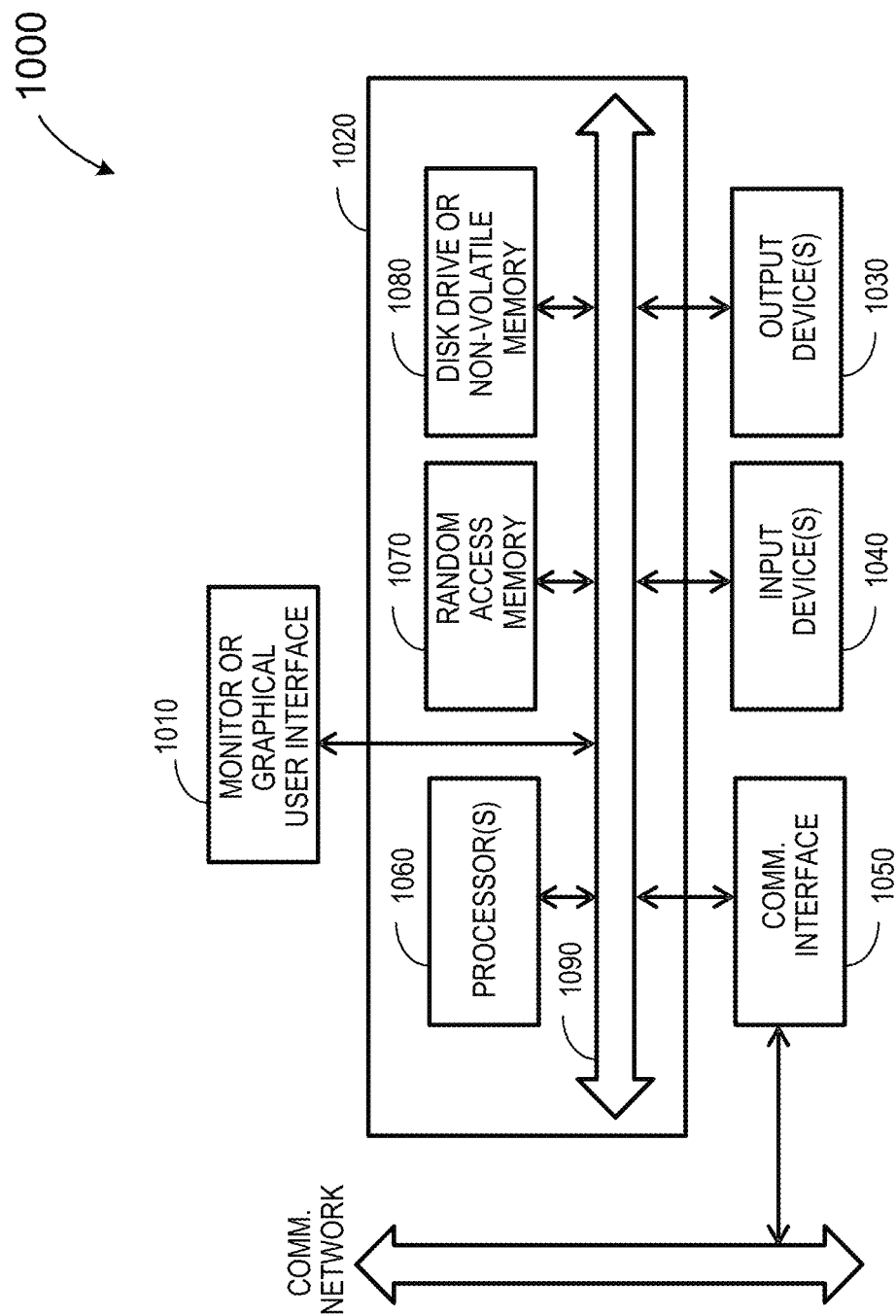
FIG. 10 is a simplified block diagram illustrating an apparatus that may be used to implement various embodiments according the present invention.

FIG. 10 is a simplified block diagram illustrating an apparatus that may be used to implement various embodiments according to the present invention. FIG. 10 is merely illustrative of an embodiment incorporating the present disclosure and does not limit the scope of the disclosure as recited in the claims. One of ordinary skill in the art would recognize other variations, modifications, and alternatives. In one embodiment, computer system 1000 typically includes a monitor 1010, a computer 1020, user output devices 1030, user input devices 1040, communications interface 1050, and the like.

FIG. 10 is representative of a computer system capable of embodying the present disclosure. For example, acoustic signal processing system 200 in FIG. 2 can be implemented using a system similar to system 1000 depicted in FIG. 10. The functions of signal processing system 250 in FIG. 2 can be carried out by one or more processors depicted in FIG.

10. For example, part of system 1000 can represent a digital signal processor that can be used to implement the phase-difference module, the delay distribution module, the delay estimation module, and the delay-and-sum module. Alternatively, software codes executed in a general purpose processor, such as described in system 1000, can be used to implement the phase-difference module, the delay distribution module, the delay estimation module, and the delay-and-sum module. Further, the interface circuit 211 and analog-to-digital converter 213 can be implemented as peripheral devices in a system similar to system 1000.

As shown in FIG. 10, computer 1020 may include a processor(s) 1060 that communicates with a number of peripheral devices via a bus subsystem 1090. These peripheral devices may include user output devices 1030, user input devices 1040, communications interface 1050, and a storage subsystem, such as random access memory (RAM) 1070 and disk drive 1080.

User input devices 1040 can include all possible types of devices and mechanisms for inputting information to computer 1020. These may include a keyboard, a keypad, a touch screen incorporated into the display, audio input devices such as voice recognition systems, microphones, and other types of input devices. In various embodiments, user input devices 1040 are typically embodied as a computer mouse, a trackball, a track pad, a joystick, wireless remote, drawing tablet, voice command system, eye tracking system, and the like. User input devices 1040 typically allow a user to select objects, icons, text and the like that appear on the monitor 1010 via a command such as a click of a button or the like.

User output devices 1030 include all possible types of devices and mechanisms for outputting information from computer 1020. These may include a display (e.g., monitor 1010), non-visual displays such as audio output devices, etc.

Communications interface 1050 provides an interface to other communication networks and devices. Communications interface 1050 may serve as an interface for receiving data from and transmitting data to other systems. Embodiments of communications interface 1050 typically include an Ethernet card, a modem (telephone, satellite, cable, ISDN), (asynchronous) digital subscriber line (DSL) unit, FireWire interface, USB interface, and the like. For example, communications interface 1050 may be coupled to a computer network, to a FireWire bus, or the like. In other embodiments, communications interfaces 1050 may be physically integrated on the motherboard of computer 1020, and may be a software program, such as soft DSL, or the like.

In various embodiments, computer system 1000 may also include software that enables communications over a network such as the HTTP, TCP/IP, RTP/RTSP protocols, and the like. In alternative embodiments of the present disclosure, other communications software and transfer protocols may also be used, for example IPX, UDP or the like. In some embodiments, computer 1020 includes one or more Xeon microprocessors from Intel as processor(s) 1060. Further, in one embodiment, computer 1020 includes a UNIX-based operating system. Processor(s) 1060 can also include special-purpose processors such as a digital signal processor (DSP), a reduced instruction set computer (RISC), etc.

RAM 1070 and disk drive 1080 are examples of tangible storage media configured to store data such as embodiments of the present disclosure, including executable computer code, human readable code, or the like. Other types of tangible storage media include floppy disks, removable hard disks, optical storage media such as CD-ROMS, DVDs and bar codes, semiconductor memories such as flash memories, read-only memories (ROMS), battery-backed volatile memories, networked storage devices, and the like. RAM 1070 and disk drive 1080 may be configured to store the basic programming and data constructs that provide the functionality of the present disclosure.

Software code modules and instructions that provide the functionality of the present disclosure may be stored in RAM 1070 and disk drive 1080. These software modules may be executed by processor(s) 1060. RAM 1070 and disk drive 1080 may also provide a repository for storing data used in accordance with the present disclosure.

RAM 1070 and disk drive 1080 may include a number of memories including a main random access memory (RAM) for storage of instructions and data during program execution and a read-only memory (ROM) in which fixed non-transitory instructions are stored. RAM 1070 and disk drive 1080 may include a file storage subsystem providing persistent (non-volatile) storage for program and data files. RAM 1070 and disk drive 1080 may also include removable storage systems, such as removable flash memory.

Bus subsystem 1090 provides a mechanism for letting the various components and subsystems of computer 1020 communicate with each other as intended. Although bus subsystem 1090 is shown schematically as a single bus, alternative embodiments of the bus subsystem may utilize multiple busses.

FIG. 10 is representative of a computer system capable of embodying the present disclosure. It will be readily apparent to one of ordinary skill in the art that many other hardware and software configurations are suitable for use with the present disclosure. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc.; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present disclosure can be implemented in the form of logic in software or hardware or a combination of both. The logic may be stored in a computer-readable or machine-readable non-transitory storage medium as a set of instructions adapted to direct a processor of a computer system to perform a set of steps disclosed in embodiments of the present disclosure. The logic may form part of a computer program product adapted to direct an information-processing device to perform a set of steps disclosed in embodiments of the present disclosure. Based on the disclosure and teachings provided herein, a person of ordinary skill in the art will appreciate other ways and/or methods to implement the present disclosure.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that, when the hardware modules or apparatuses are activated, they perform the associated methods and processes. The methods and processes disclosed herein may be embodied using a combination of code, data, and hardware modules or apparatuses.

Certain embodiments have been described. However, various modifications to these embodiments are possible, and the principles presented herein may be applied to other embodiments as well. In addition, the various components and/or method steps/blocks may be implemented in arrangements other than those specifically disclosed without departing from the scope of the claims. Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. An acoustic signal processing system, comprising:
an input module configured to:
receive at least two acoustic signals via at least two acoustic sensors;
convert the at least two acoustic signals into at least two channels of analog signals and, subsequently, at least two channels of digital signals;
a phase-difference module configured to:
convert the at least two channels of digital signals to at least two channels of frequency transforms; and
calculate phase differences between two selected channels;
wherein each frequency transform comprises a plurality of complex numbers;
wherein each complex number corresponds to a frequency bin; and
wherein each phase difference is defined within $(-\pi, \pi)$ or $(-180$ degrees, $180$ degrees$)$;
a delay distribution module configured to: for each frequency bin,
derive ambiguous delays from the phase differences by adding or subtracting multiples of $2\pi$ or $360$ degrees;
keep the ambiguous delays within a valid delay range as candidate delays;
for each candidate delay, add a spread function centering each candidate delay to form a delay distribution function;
wherein the valid delay range is predetermined according to a maximum acoustic propagation time delay between the at least two acoustic sensors plus a headroom;
a delay estimation module configured to make a final delay estimation based on the delay distribution function; and
a delay-and-sum module configured to align one of the two selected channels according to the final delay estimation to obtain a signal of interest.

2. The system of claim 1, wherein the delay distribution module is further configured to apply a frequency-dependent weighting function to the spread function.

3. The system of claim 1, wherein the delay distribution module is configured to apply an energy-dependent temporal adapting scheme to smooth the delay distribution function before making the final delay estimation.

4. The system of claim 1, wherein the phase-difference module is configured to use Fourier transform to convert the at least two channels of digital signals to at least two channels of frequency transforms.

5. The system of claim 1, further comprising a digital signal processor to implement the phase-difference module, the delay distribution module, the delay estimation module, and the delay-and-sum module.

6. The system of claim 1, further comprising software codes executed in a general purpose processor to implement the phase-difference module, the delay distribution module, the delay estimation module, and the delay-and-sum module.

7. An acoustic signal processing system, comprising:
a microphone interface circuit configured for coupling to first and second acoustic sensors to receive first and second acoustic signals from a same acoustic signal source and to convert the first and second acoustic signals to first and second analog signals, respectively;
an analog-to-digital converter configured to receive the first and second analog signals and to generate first and second digital signals, respectively; and
a signal processing circuit configured to receive the first and second digital signals and to determine a delay between the first and second digital signals, wherein the signal processing circuit comprises:
a phase-difference module configured to:
transform the first and second digital signals to provide first and second frequency domain signals;
calculate a first set of phase differences between the first and second frequency domain signals at a plurality of selected frequencies;
wherein each phase difference is a value defined within $(-\pi, \pi)$ or $(-180$ degrees, $180$ degrees$)$;
a delay distribution module configured to:
derive a second set of phase differences by adding and subtracting multiples of $2\pi$ or $360$ degrees to each of the first set of phase differences;
derive a plurality of candidate delay times at the plurality of selected frequencies based on the first set of phase differences and the second set of phase differences;
for each candidate delay, add a spread function centering each candidate delay to form a delay distribution function; and
determine a histogram of the plurality of candidate delay times;
a delay estimation module configured to determine an estimated delay time by selecting a delay time having a maximum count in the histogram of the plurality of candidate delay times; and
a delay-and-sum module configured to align the first and second digital signals according to the estimated delay time to obtain a signal of interest.

8. The system of claim 7, wherein the delay distribution module is further configured to apply a frequency-dependent weighting function to the spread function.

9. The system of claim 8, wherein the delay distribution module is configured to apply an energy-dependent temporal adapting scheme to smooth the delay distribution before determining the estimated delay time.

10. The system of claim 7, wherein the phase-difference module is configured to use Fourier transform to transform the first and second digital signals to provide first and second frequency domain signals.

11. The system of claim 7, wherein the delay distribution module is further configured to, for each frequency bin,
   select the plurality of candidate delay times within a valid delay range as candidate delays;
   wherein valid delay range is predetermined according to the maximum acoustic propagation time delay between the first and second acoustic sensors plus a headroom.

12. The system of claim 7, wherein the signal processing circuit comprises a digital signal processor.

13. The system of claim 7, wherein the first and second acoustic sensors are disposed apart by a spacing greater than a half wavelength of the acoustic signals.

14. A method, comprising:
   receiving acoustic signals from an acoustic signal source using first and second acoustic sensors, the first acoustic sensor receiving a first acoustic signal and the second acoustic sensor receiving a second acoustic signal;
   converting the first and second acoustic signals into first and second digital signals;
   transforming the first and second digital signals into first and second frequency domain signals;
   determining a first set of phase differences between the first and second frequency domain signals, the first set of phase differences being defined within $(-\pi, \pi)$ or $(-180$ degrees, $180$ degrees$)$;
   determining a second set of phase differences by adding and subtracting multiples of $2\pi$ or 360 degrees to each of the first set of phase differences;
   determining a plurality of candidate delay times between the first and second frequency domain signals at a plurality of frequencies based on the first set of phase differences and the second set of phase differences;
   for each candidate delay, adding a spread function centering each candidate delay to form a delay distribution function; and
   selecting an estimated delay time from the plurality of candidate delay times, the estimated delay time being associated with a largest number of the plurality of frequencies, wherein the estimated delay time is associated with an estimated distance between the first and second acoustic sensors.

15. The method of claim 14, further comprising applying a frequency-dependent weighting function to the spread function.

16. The method of claim 14, further comprising apply an energy-dependent temporal adapting scheme to smooth the delay distribution function before making the final delay estimation.

17. The method of claim 14, further comprising using a Fourier transform to transform the first and second digital signals into first and second frequency domain signals.

18. The method of claim 14, wherein the first and second acoustic sensors are disposed apart by a spacing greater than a half wavelength of the acoustic signals.

19. The method of claim 14, further comprising:
   determining a histogram of the plurality of candidate delay times; and
   determining an estimated delay time by selecting a delay time having a maximum count in the histogram of the plurality of candidate delay times.

* * * * *